United States Patent
Hess

(10) Patent No.: US 9,297,492 B2
(45) Date of Patent: Mar. 29, 2016

(54) HOUSING, IN PARTICULAR A PROTECTIVE INSTRUMENT HOUSING WITH AT LEAST ONE COMPONENT TO BE PROTECTED DISPOSED THEREIN

(71) Applicant: Martin Hess, Ingolstadt (DE)

(72) Inventor: Martin Hess, Ingolstadt (DE)

(*) Notice: Subject to any disclaimer, the term of this patent is extended or adjusted under 35 U.S.C. 154(b) by 386 days.

(21) Appl. No.: 13/934,540

(22) Filed: Jul. 3, 2013

(65) Prior Publication Data

US 2014/0014655 A1 Jan. 16, 2014

(30) Foreign Application Priority Data

Jul. 3, 2012 (DE) .......................... 10 2012 013 135

(51) Int. Cl.
| | |
|---|---|
| *B32B 5/10* | (2006.01) |
| *F16L 59/02* | (2006.01) |
| *B65D 1/40* | (2006.01) |
| *F16L 59/16* | (2006.01) |

(52) U.S. Cl.
CPC .................. *F16L 59/029* (2013.01); *B32B 5/10* (2013.01); *B65D 1/40* (2013.01); *F16L 59/16* (2013.01); *F16L 59/161* (2013.01); *Y10T 428/1366* (2015.01)

(58) Field of Classification Search
CPC ....... F16L 59/029; F16L 59/16; F16L 59/161; B32B 1/02; B32B 1/08; B32B 5/02; B32B 5/10; Y10T 428/1362; Y10T 428/1366; Y10T 428/1372

See application file for complete search history.

(56) References Cited

FOREIGN PATENT DOCUMENTS

| | | |
|---|---|---|
| DE | 3540455 A1 | 5/1987 |
| DE | 102004050442 A1 | 5/2006 |
| DE | 19818545 B4 | 1/2008 |
| WO | 9417142 A1 | 8/1994 |
| WO | 2006134236 A1 | 12/2006 |

*Primary Examiner* — Walter B Aughenbaugh
(74) *Attorney, Agent, or Firm* — Laurence A. Greenberg; Werner H. Stemer; Ralph E. Locher

(57) ABSTRACT

A casing is particularly suited as a protective instrument casing. At least one component that is to be protected is accommodated in the casing. The casing has a casing wall configured as a multi-layered sandwich element, the casing wall being formed by two outer GRP (glass reinforced plastic) exterior walls which are spaced apart from one another and made from a glass-fiber plastic material. A core of mineral wool is arranged and accommodated between the walls, forming a mineral wool intermediate layer. A flame-retardant layer is located between at least one of the GRP exterior walls and the mineral wool intermediate layer; in particular the mineral wool intermediate layer is coated with a flame retardant layer on at least one of its sides which face the GRP exterior walls.

19 Claims, 3 Drawing Sheets

HOUSING, IN PARTICULAR A PROTECTIVE INSTRUMENT HOUSING WITH AT LEAST ONE COMPONENT TO BE PROTECTED DISPOSED THEREIN

BACKGROUND OF THE INVENTION

Field of the Invention

The invention relates to a casing, in particular a protective instrument casing having at least one component to be protected which is accommodated therein. The casing has a casing wall configured as a multi-layered sandwich element, the casing wall being formed by two outer GRP exterior walls which are spaced apart from one another and made from a glass-fiber plastic material, and between which a core of mineral wool is arranged and accommodated as a mineral wool intermediate layer.

In particular in chemical and petrochemical installations, specific components, such as drives for fittings which are relevant to safety (for example emergency shut-offs), but also components of fire-extinguishing installations, need to be protected from heat in the event of a fire. The use of special casings or protective instrument casings which have a casing wall configured as a multi-layered sandwich element, is generally known. The casing wall is formed by two outer GRP exterior walls which are spaced apart from one another and made from a glass-fiber plastic material, and between which a core of mineral wool is arranged and accommodated as a mineral wool intermediate layer. Such a casing configuration is, in particular, also suited to outdoor applications and offers high resistance to corrosion and protects the component to be protected which is accommodated therein against overheating.

With such conventional casing configurations required component protection can be sustained for about 30 to 35 minutes at temperatures of about 800° C., this already representing very good fire protection of the components encased by the casing.

However, in particular in chemical or petrochemical installations, very high fire temperatures of more than 1000° C., or far beyond 1000° C., for example 1700° C., can be reached after only a short time under certain conditions, for example during the combustion of hydrocarbons, caused among other things by exothermic combustion of the GRP exterior walls. These temperatures are then also above the flash point of the mineral wool intermediate layer, ultimately leading to faster destruction of the protective instrument casing. Given such high temperatures, there is the risk that the components to be protected which are accommodated in the protective instrument casing cannot be adequately protected by means of the conventional casing configuration against destruction.

BRIEF SUMMARY OF THE INVENTION

It is thus an object of the present invention to provide a casing, in particular a protective instrument casing having at least one component to be protected which is accommodated therein, by means of which casing reliable fire protection for the components to be protected which are accommodated in the casing can be sustained for a defined time, even in the event of a fire with very high temperatures occurring after only a short time, in particular temperatures above 1000° C.

This object is achieved by the features as claimed. Particularly preferred embodiments thereof are the subject matter of the dependent patent claims referred back thereto.

According to the invention, a casing, in particular a protective instrument casing having at least one component to be protected which is accommodated therein, is proposed, which has a casing wall configured as a multi-layered sandwich element, the casing wall being formed by two outer GRP exterior walls which are spaced apart from one another and made from a glass-fiber plastic material, and between which a core of mineral wool is located and accommodated as mineral wool intermediate layer. According to the invention, a flame retardant layer is located between at least one of the GRP exterior walls and the mineral wool intermediate layer; in particular the mineral wool intermediate layer is coated with a flame retardant layer on at least one of its sides which face the GRP exterior walls.

As tests carried out by the inventor have surprisingly demonstrated, simply by providing a flame retardant layer of such a type the service life of the casing can be substantially increased, even in such fire situations during which very high temperatures of more than 1000° C., or far beyond 1000° C., for example about 1700° C., occur over a short period, and, as a result, the components to be protected which are accommodated in the casing can be reliably protected against destruction for a defined duration of time, in particularly at least for 60 minutes. This is because the flame retardant layer keeps the heat of the exothermically combusting GRP exterior walls away from the mineral wool intermediate layer for a long time, which results in the considerably increased service life. Such a configuration, in which the at least one component to be protected which is accommodated therein constitutes the only heat sink, thus ensures that the temperature of this component is reliably held for as long as possible below a defined limiting temperature, for example a limiting temperature of 60° C.

Such a flame retardant layer does not require any major modification of the altogether proven casing design and can be applied in a simple manner, for example to the mineral wool intermediate layer, the application preferably occurring bilaterally, that is to say in each case assigned to both GRP exterior walls. The flame retardant layer here may be formed by any suitable flame retardant agent, by means of which, for example, the mineral wool intermediate layer and/or the GRP exterior walls are coated on their inner side, which faces the mineral wool intermediate layer.

Particularly preferred is an embodiment according to the invention in which the at least one flame retardant layer is configured in such a manner that the casing wall formed by the GRP exterior walls, the at least one flame retardant layer and the mineral wool intermediate layer has a fire resistance rating against fire penetration through the casing wall of at least 60 minutes, preferably of at least 90 minutes, under the test conditions mentioned below:
  hydrocarbon fire;
  heat flow 200 to 230 kW/m$^2$;
  an approximately constant temperature of 1100 +/−200° C. is reached after about 2 to 8 minutes, in particular after about 4 to 6 minutes.

The actual flame retardant layer is an endothermically acting flame retardant layer in the event of a fire. With such an endothermically acting flame retardant layer, advantageous cooling of the casing is achieved in the event of exposure to fire, for example by the evaporation of water which is chemically or physically bound in the flame retardant agent of the flame retardant layer.

As a rule, the mineral wool of the mineral wool intermediate layer has a flash point which is higher than that of the GRP exterior walls. An embodiment is also particularly preferred in which the mineral wool of the mineral wool intermediate layer according to DIN4102-17 has a flash point of 1000° C. to 1200° C. at maximum and/or the GRP exterior walls according to DIN4102-17 have a flash point of 350° C. to 400° C.

With such a mineral wool intermediate layer or with such GRP exterior walls, the casing design according to the invention can be implemented in a particularly simple manner with the aforementioned advantages.

The mineral wool intermediate layer is preferably formed by rock wool, which has particularly high resistance to fire.

It is particularly preferable to provide the mineral wool of the mineral wool intermediate layer with a fiber structure in which the fibers are at least in part oriented substantially perpendicularly to the GRP exterior walls. With such a fiber structure, in which the fibers are oriented substantially perpendicularly to the GRP exterior walls, substantially improved compressive strength, tensile strength and shear strength are achieved compared to conventional mineral wool intermediate layers. On account of this, in particular also sandwich elements or casing walls having greater spans can be manufactured, which is of particular advantage when comparatively expansive casings are used, for example in conjunction with floor-mounted protective instrument cabins as casings.

According to a further particularly preferred concrete embodiment, the GRP exterior walls are adhesively bonded to the mineral wool intermediate layer. Here, according to a first variant of embodiment, the flame retardant layer, which has been bilaterally applied to the mineral wool intermediate layer, can, if appropriate, act as adhesive, and adhesively bond the GRP exterior walls to the mineral wool intermediate layer. In such a case, the flame retardant layer can, for example, be applied directly as an adhesive layer to the mineral wool intermediate layer and/or the GRP exterior walls. A particularly advantageous double function is achieved with such a configuration by means of the flame retardant layer, in that said flame retardant layer also simultaneously acts as adhesive. Alternatively to this, according to a particularly preferred embodiment, it may be provided that the GRP exterior walls are adhesively bonded to the mineral wool intermediate layer or to the flame retardant layer by means of a separate adhesive layer. On account of this, an altogether fail-safe configuration of an exterior wall of the casing in the form of a multi-layered sandwich element is achieved.

According to a further particularly preferred embodiment it is provided that a plurality of mineral wool intermediate layers, which are separated from one another by intermediate walls, preferably by GRP intermediate walls made from a glass-fiber plastic material, are located and accommodated between the two GRP exterior walls. Here, too, it may be provided that a flame retardant layer is located between the at least one intermediate wall and the mineral wool intermediate layer, in particular that the mineral wool intermediate layer is coated with a flame retardant layer on its side which faces the intermediate wall. With such a configuration, which is advantageous in particular in conjunction with comparatively large casings or cabin-style protective instrument casings, a further enhancement of the fireproofing properties is achieved, since in the event, for example, of a destroyed exterior wall of the casing, a configuration of the casing in the region of the sandwich element is still provided which meets the requirements for absorbing stress such as apply in the case of intact, conventional sandwich elements or casing wall regions which have the conventional configuration with two GRP exterior walls and a mineral wool intermediate layer lying in between these as a flame retardant layer. With such a solution, the conventional stability of sandwich elements is sustained in a simple manner even in the event of a fire.

The term "casing" here relates to all structures which for reasons of fire safety legislation must meet high fireproofing requirements. Particularly preferred in this context is an embodiment in which the mineral wool intermediate layers, being fireproofing layers, have a higher melting point than the GRP exterior walls (and, if appropriate, the GRP intermediate walls).

According to a particularly preferred concrete embodiment, which is explicitly also claimed independently of the casing (patent claim 13), it is provided that the casing is located on a media-carrying process line and encases at least one component which is in an operational connection to the process line, in particular a measuring instrument and/or an actuator for actuating a positioning element of the process line, the component leading, preferably in a sealed manner, out of the casing by means of a connecting element and being coupled to the media-carrying process line. As a result, the particularly advantageous fireproofing of components which are relevant to safety as described earlier, as required for example in chemical and petrochemical installations, is achieved in a simple manner.

The invention is described in more detail with reference to a drawing, in which:

DESCRIPTION OF THE INVENTION

Figure 1:
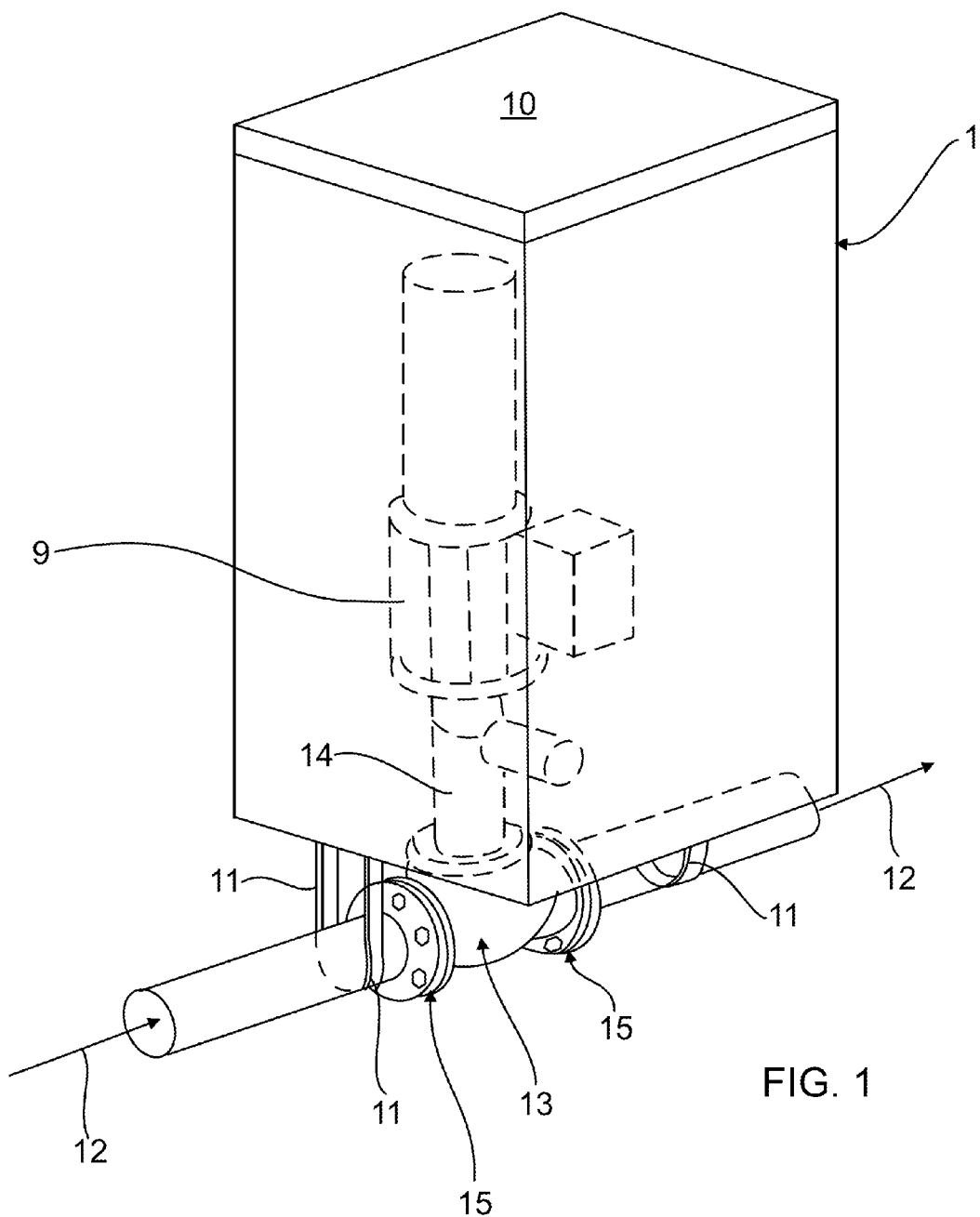
FIG. 1 shows a schematic and perspective view of a positioning element drive on a process line of a chemical installation, the positional element drive being encased by an exemplary embodiment of a protective instrument casing according to the invention.

In FIG. 1, a schematic and perspective view of an arrangement of a protective instrument casing 1 on a process line 8 of a chemical or petrochemical industrial installation (not shown here in more detail) is shown. A medium 12 passes through this process line 8, a positioning element 13 (not shown here in more detail) being integrated into the process line 8, by means of which positioning element 13 for example a shut-off of the process line 8, in particular an emergency shut-off in the event of a fire, can be effected. The actuation of the positioning element 13 occurs by means of a positioning element drive 9, which here in an exemplary manner protrudes upwards from the process line 8, is encased by the protective instrument casing 1 and is accommodated in a preferably sealed manner in the interior of said protective instrument casing 1. To this end, the positioning element drive 9 leads, preferably in a gas-tight and liquid-tight manner, through a floor wall of the casing wall of the protective instrument casing 1 by means of a connecting element 14, this, however, not being illustrated in more detail here.

For the purpose of easy accessibility to the protective instrument casing 1, the latter may have a casing cover 10 which is mounted releasably and preferably in a gas-tight and liquid-tight manner on the protective instrument casing 1.

The mounting of the protective instrument casing 1 on the process line 8 is preferably additionally supported by mounting brackets 11 which engage around the process line 8.

As is further evident in FIG. 1, the positioning element 13 may be coupled to the process line 8 by means of conventional flange connections 15.

Figure 2:
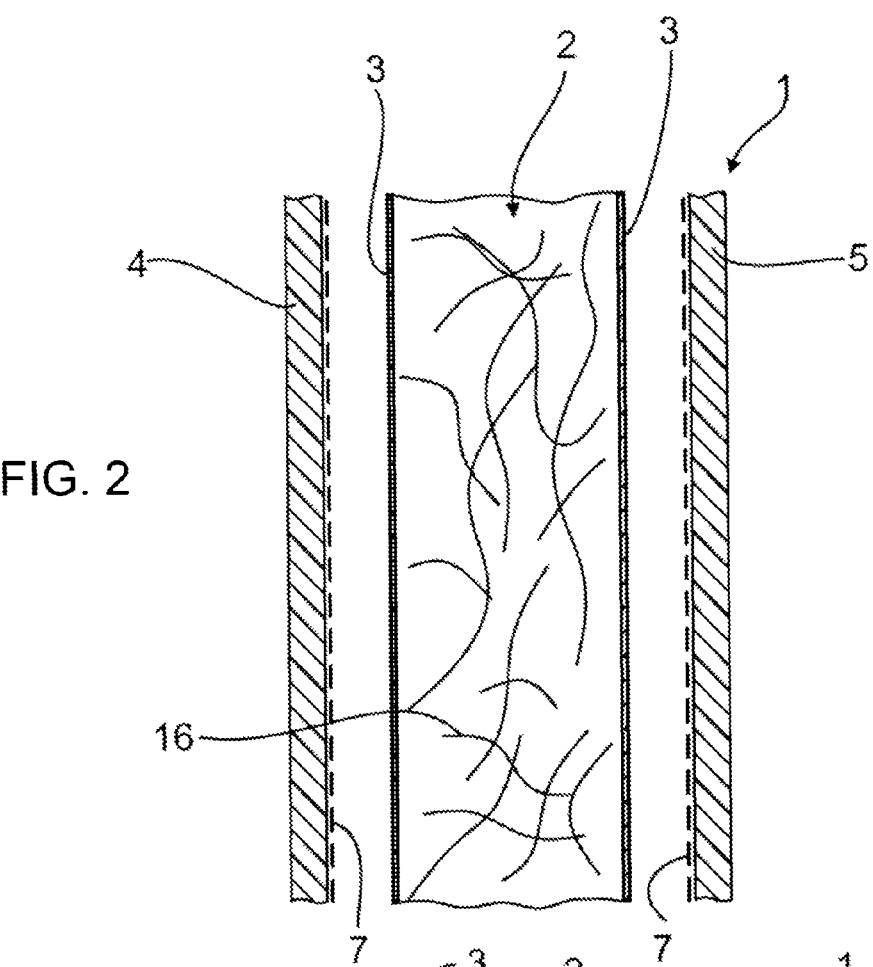
FIG. 2 shows a schematic exemplary cross-section of a part region of the casing wall in an exploded view.
Figure 3:
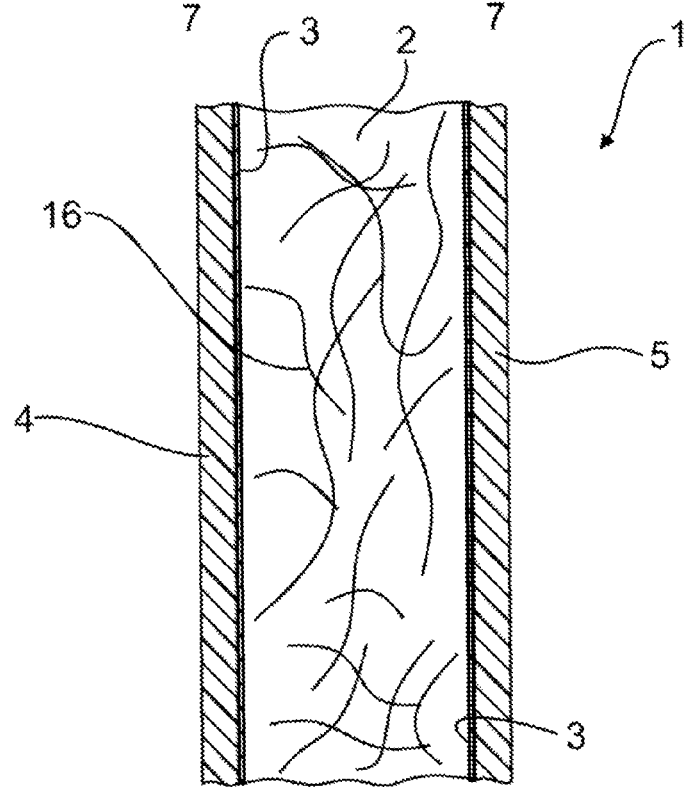
FIG. 3 shows the illustration of FIG. 2 in an assembled state.

In FIGS. 2 and 3, a cross-section of the casing wall of the protective instrument casing 1 is now shown schematically and in an exemplary manner, the casing wall being configured as a multi-layered sandwich element and formed by two outer GRP exterior walls 4, 5 which are spaced apart from one another and made from a glass-fiber plastic material, and between which a core of mineral wool, in particular rock wool, is located and accommodated as a mineral wool intermediate layer 2. The GRP exterior walls 4, 5 here have a lower flash point than the mineral wool intermediate layers. For example, the flash point of the GRP exterior walls 4, 5 is between 350° C. and 400° C., while the flash point of the mineral wool intermediate layers is between 1000° C. and 1200° C.

As can be gathered in particular from the exploded illustration of FIG. 2, the mineral wool intermediate layer 2, which is formed by, for example, rock wool, and, on the sides which are opposite one another and face the GRP exterior walls 4, 5, is coated with a flame retardant layer 3 made from a endothermal flame retardant agent, the flame retardant layer 4 additionally being configured in such a manner that in the event of a hydrocarbon fire when there is a heat flow between 200 to 230 kW/m² and the attainment of an approximately constant temperature of 1100 +/−200° C. is reached after about 2 to 8 minutes, in particular after about 4 to 6 minutes, a fire resistance rating against fire penetration through the casing wall is provided of at least 60 minutes, preferably of at least 90 minutes. As a result, in the event of a fire, the positioning element drive 9 can be protected against destruction for a very long time even at very high temperatures, such as may occur in a hydrocarbon fire, and for example an emergency shut-off of the installation or the process line 8 may be effected reliably and in a fail-safe manner even over a comparatively long period of time in the event of extreme fires.

As is indicated in FIG. 2 by only a dashed line, the GRP exterior walls 4, 5 may be adhesively bonded by means of a separate adhesive layer 7 to the mineral wool intermediate layer 2 which is coated with the flame retardant layer 3, in order to provide an altogether stable, supporting casing wall structure. Alternatively, however, the adhesive bonding of the mineral wool intermediate layer 2 to the GRP exterior walls 4, 5 could be effected by the flame retardant layer 3 itself.

The fiber structure of the mineral wool intermediate layer 2 in the embodiments of FIGS. 2 and 3 is conventional and irregular. In the event that particularly high compressive strength, tensile strength and shear strength of the casing wall are to be made available, it may also be provided that the fiber structure 16 is configured such that some of its fibers are oriented substantially perpendicularly to the GRP exterior walls 4, 5, as is illustrated schematically and in an exemplary manner in FIG. 4.

Figure 4:
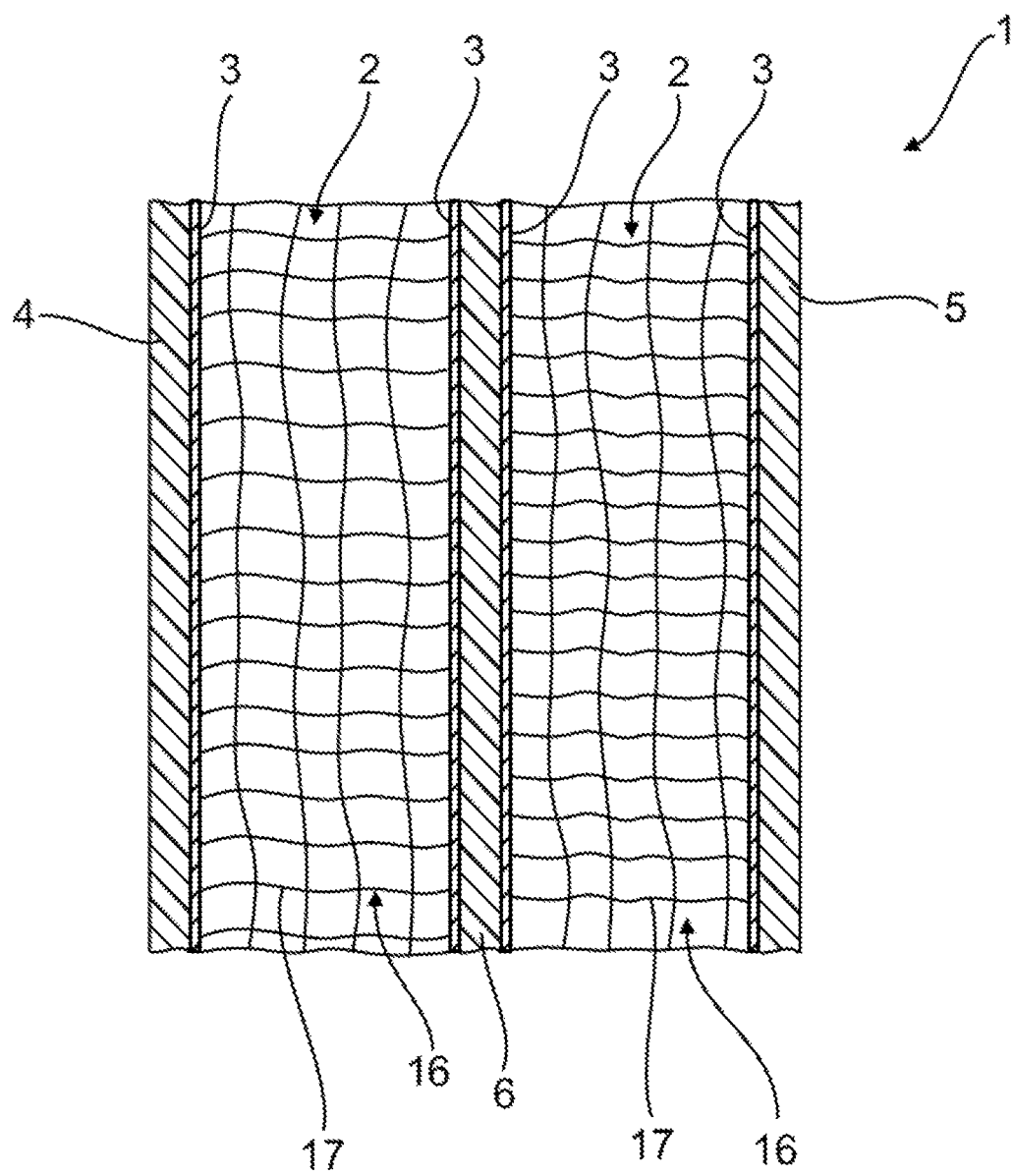
FIG. 4 shows a schematic and exemplary cross-section of a casing wall which has a GRP intermediate wall and two mineral wool intermediate layers, their fiber structure being oriented perpendicularly to the GRP exterior wall or to the intermediate wall.

Furthermore, in FIG. 4 a configuration of the casing wall of the protective instrument casing 1 having a double sandwich structure as an alternative to the embodiment according to FIGS. 2 and 3, is also shown, in which a further GRP intermediate wall 6 made from a glass-fiber plastic material is provided between the two GRP exterior walls 4, 5, which GRP intermediate wall 6 can be identically configured to the GRP exterior walls 4, 5. Accordingly, two mineral wool intermediate layers 2 are then located here in the region between the two GRP exterior walls 4, 5 and the GRP intermediate wall 6 arranged between them. In a manner analogous to the embodiment described earlier according to FIGS. 2 and 3, a flame retardant layer 3 may in each case be provided between the mineral wool intermediate layer 2 and the GRP intermediate wall 6. Such a wall configuration is particularly suited to cabin-style protective instrument casings which are, for example, likewise not located on a process line but are freestanding, and in which corresponding instruments and installations, for example electronic and/or electrical components, such as, for example, measuring instruments, analytical instruments, etc. are located and accommodated. Such cabins may, for example, also be of a walk-in type.

The invention claimed is:

1. A protective casing, comprising:
a multi-layered sandwich element forming a casing wall, said sandwich element including two outer, spaced-apart GRP exterior walls formed of glass-fiber plastic material, and a core of mineral wool disposed in an intermediate space between said spaced-apart GRP exterior walls and forming a mineral wool intermediate layer; and
a flame retardant layer disposed between at least one of said GRP exterior walls and said mineral wool intermediate layer.

2. The casing according to claim 1, wherein said mineral wool intermediate layer is coated with a flame retardant layer on at least one side thereof facing said GRP exterior walls.

3. The casing according to claim 1, configured with an interior space forming a protective instrument casing with at least one component to be protected accommodated therein.

4. The casing according to claim 1, wherein said at least one flame retardant layer is configured such that said casing wall formed by said GRP exterior walls, said at least one flame retardant layer and said mineral wool intermediate layer, has a fire resistance rating against fire penetration through said casing wall of at least 60 minutes under the following test conditions:
hydrocarbon fire;
heat flow between 200 to 230 kW/m²;
a substantially constant temperature of 1100±200° C. reached after about 2 to 8 minutes.

5. The casing according to claim 4, wherein the fire resistance rating of said casing wall is at least 90 minutes, and the constant temperature of the test conditions is reached after about 4 to 6 minutes.

6. The casing according to claim 1, wherein said flame retardant layer is formed to act as an endothermic flame retardant layer in the event of a fire.

7. The casing according to claim 1, wherein the mineral wool of the intermediate layer, according to DIN 4102-17, have has a flash point of 1000° C. to 1200° C. and/or wherein said GRP exterior walls according to DIN 4102-17 have a flash point of 350° C. to 400° C.

8. The casing according to claim 1, wherein said mineral wool intermediate layer comprises mineral wool formed of rock wool.

9. The casing according to claim 1, wherein said mineral wool intermediate layer comprises mineral wool having a fiber structure in which at least some of said fibers are oriented substantially perpendicularly to said GRP exterior walls.

10. The casing according to claim 1, wherein said GRP exterior walls are adhesively bonded to said mineral wool intermediate layer.

11. The casing according to claim 10, wherein the flame retardant layer, which has been applied to both sides of the mineral wool intermediate layer, acts as adhesive, and the GRP exterior walls are adhesively bonded to the mineral wool intermediate layer.

12. The casing according to claim 10, which comprises a separate adhesive layer disposed to adhesively bond said GRP exterior walls to said mineral wool intermediate layer or to said flame retardant layer.

13. The casing according to claim 1, wherein said mineral wool intermediate layer is one of a plurality of mineral wool intermediate layers separated from one another by intermediate walls and disposed and accommodated between said two GRP exterior walls.

14. The casing according to claim 13, wherein said intermediate walls are GRP intermediate walls made of a glass-fiber plastic material.

15. The casing according to claim 13, which comprises a further flame retardant layer disposed between at least one of said intermediate walls and said mineral wool intermediate layer.

16. The casing according to claim 15, wherein said mineral wool intermediate layer is coated on a side thereof facing said intermediate wall with said further flame retardant layer.

17. The casing according to claim 1, wherein the casing is arranged on a media-carrying process line and encases at least one component which is in an operational connection to the process line, the component leading out of the casing by way of a connecting element and being coupled to the process line.

18. The casing according to claim 17, wherein at least one component is a measuring instrument and/or an actuator for actuating a positioning element of the process line, and the component leads out of the casing in a sealed manner.

19. In combination, a casing according to claim 1 on a process line for encasing at least one component which is in operational connection with the process line.

* * * * *